(12) United States Patent
Kwon et al.

(10) Patent No.: US 8,804,635 B2
(45) Date of Patent: Aug. 12, 2014

(54) METHOD OF TRANSMITTING AND RECEIVING DATA IN A WIRELESS SYSTEM

(75) Inventors: Yeong Hyeon Kwon, Gyeonggi-do (KR); Jae Hoon Chung, Gyeonggi-do (KR); Ja Ho Koo, Gyeonggi-do (KR); Hyun Soo Ko, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 158 days.

(21) Appl. No.: 13/143,486

(22) PCT Filed: Jan. 7, 2010

(86) PCT No.: PCT/KR2010/000101
§ 371 (c)(1),
(2), (4) Date: Jul. 6, 2011

(87) PCT Pub. No.: WO2010/085054
PCT Pub. Date: Jul. 29, 2010

(65) Prior Publication Data
US 2011/0305185 A1 Dec. 15, 2011

Related U.S. Application Data

(60) Provisional application No. 61/145,976, filed on Jan. 21, 2009.

(51) Int. Cl.
*H04W 4/00* (2009.01)
*H04L 27/26* (2006.01)
*H04L 5/00* (2006.01)
*H04W 56/00* (2009.01)

(52) U.S. Cl.
CPC ......... *H04W 56/003* (2013.01); *H04L 27/2607* (2013.01); *H04L 5/0035* (2013.01); *H04L 5/0032* (2013.01); *H04L 5/0007* (2013.01); *H04L 5/0044* (2013.01)
USPC ........................... 370/329; 370/281; 370/328

(58) Field of Classification Search
CPC .. H04L 5/0053; H04L 5/0007; H04W 72/005
See application file for complete search history.

(56) References Cited

U.S. PATENT DOCUMENTS

2001/0040928 A1* 11/2001 Sakoda .......................... 375/260
2003/0083014 A1*  5/2003 Li et al. .......................... 455/63

(Continued)

FOREIGN PATENT DOCUMENTS

| EP | 1892865 A1 * | 2/2008 | ............. H04L 27/26 |
| KR | 10-0768510 | 10/2007 | |
| KR | 10-0884556 | 2/2009 | |

OTHER PUBLICATIONS

International Search Report for PCT/KR2010/000101 (PCT corresponding to present application).

*Primary Examiner* — Kibrom T Hailu
*Assistant Examiner* — James P Duffy
(74) *Attorney, Agent, or Firm* — Morgan, Lewis & Bockius LLP (57) ABSTRACT

A method of transmitting data in a wireless communication is disclosed, by which timing error can be solved in a multi-cell environment. The present invention, in which data is transmitted by a serving cell to a mobile station communicating with a plurality of cells in a wireless communication system, includes receiving information on delay times of signals from the mobile station, wherein the signals are received by the mobile station from the plurality of the cells and transmitting data to the mobile station by inserting a cyclic prefix (CP) having a length determined according to the information on the delay times into the data.

4 Claims, 6 Drawing Sheets

(56) References Cited

U.S. PATENT DOCUMENTS

| | | | |
|---|---|---|---|
| 2003/0099304 A1* | 5/2003 | Gore et al. | 375/267 |
| 2004/0228313 A1* | 11/2004 | Cheng et al. | 370/342 |
| 2004/0264431 A1* | 12/2004 | Rhodes | 370/343 |
| 2006/0087961 A1* | 4/2006 | Chang et al. | 370/203 |
| 2007/0165567 A1* | 7/2007 | Tan et al. | 370/329 |
| 2007/0171811 A1 | 7/2007 | Lee et al. | |
| 2010/0061224 A1 | 3/2010 | Noh et al. | |
| 2010/0118989 A1* | 5/2010 | Sayana et al. | 375/260 |
| 2010/0150085 A1* | 6/2010 | Ishii et al. | 370/329 |

* cited by examiner

METHOD OF TRANSMITTING AND RECEIVING DATA IN A WIRELESS SYSTEM

The present application is a national stage of PCT International Application No. PCT/KR2010/000101 filed Jan. 7, 2010, and claims the benefit of U.S. Provisional Application No. 61/145,976, filed Jan. 21, 2009.

TECHNICAL FIELD

The present invention relates to a wireless communication system, and more particularly, to a method of transmitting data in a wireless communication system.

BACKGROUND ART

The present invention relates to a method of overcoming a delay of signal in an environment in which the signal delay takes place.

As a representative example of generating a signal delay, there is a coordinated multi-point (hereinafter abbreviated CoMP). Specifically, when a receiving stage receives signals from multiple points located physically existing at different locations, the signals received from the multiple points may not be synchronized with each other. For instance, when a base station existing at one location simultaneously transmits signal into multi-cell identified at the corresponding point, timing ambiguity or delay tends not to occur. On the contrary, in case that signals are transmitted/received to/from physically different locations, different delays are experienced while the signals propagate to the physically different locations. Hence, the signals received by the corresponding receiving stage have delay values differing from each other. Moreover, in a downtown area, it is easy to observe that signals arrive at a receiving stage with different delays despite a physically equal distance due to waveguide effect of signal and the like. Due to this reason, it is difficult to implement CoMP (coordinated multi-point) schemes.

The CoMP scheme is usable between macro cells, between macro cell and femto cell or between macro cell and relay node. And, the CoMP scheme is usable to other structural configurations. In an environment for a user equipment transmit/receive signals to/from a plurality of cells, if the signals transmitted from a plurality of the cells have the same delay, CoMP operations are enabled through simple logical signaling.

Yet, if the signals received from a plurality of the cells differ from each other in delay, it is unable to solve the delay differences of the signals received from a plurality of the cells using inter-symbol interference correction in consideration of a delay spread of a single-cell system.

In OFDM system, timing/frequency error considerably affects system performance. Yet, since the CoMP scheme considerably affects the timing error, when a receiving stage receives a signal, performance can be seriously degraded. In order to improve such performance degradation, the receiving stage should implement complicated algorithm.

DISCLOSURE OF INVENTION

Technical Problem

However, as mentioned in the foregoing description of the related art, performance of system is degraded due to timing error in a multi-cell environment. And, complexity of a receiving stage is raised.

Solution to Problem

Accordingly, the present invention is directed to a method of transmitting data in a wireless communication system that substantially obviates one or more of the problems due to limitations and disadvantages of the related art.

An object of the present invention is to provide a method of transmitting data, by which timing error can be solved in a multi-cell environment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting data to a mobile station communicating with a plurality of cells at a serving cell in a wireless communication system, according to the present invention includes the steps of receiving information on delay times of signals from the mobile station, wherein the signals are received by the mobile station from the plurality of the cells and transmitting data to the mobile station by inserting a cyclic prefix (CP) having a length determined according to the information on the delay times into the data.

Preferably, the information on the delay times comprises a maximum delay time among the delay times of the signals received by the mobile station from each of the plurality of the cells.

To further achieve these and other advantages and in accordance with the purpose of the present invention, a method of transmitting data to a mobile station communicating with a plurality of cells at a serving cell in a wireless communication system, includes the steps of allocating data to a resource with at least two subcarrier intervals in a frequency domain and performing inverse fast Fourier transform (IFFT) on the allocated data in the frequency domain.

To further achieve these and other advantages and in accordance with the purpose of the present invention, a method of transmitting data to a mobile station communicating with a plurality of cells at a serving cell in a wireless communication system, includes the steps of generating a time domain signal by arranging data on a single carrier in the time domain and inserting a cyclic prefix and/or a cyclic postfix and generating a frequency domain signal by performing discrete Fourier transform (DFT) on the time domain signal and then mapping the DFT performed signal to a subcarrier on a frequency axis.

Preferably, the method further includes the steps of performing inverse fast Fourier transform (IFFT) on the frequency domain signal and transmitting the IFFT performed signal.

To further achieve these and other advantages and in accordance with the purpose of the present invention, a method of transmitting data to a mobile station communicating with a plurality of cells at a serving cell in a wireless communication system, includes the steps of receiving information on delay times of signals from the mobile station, wherein the signals are received by the user equipment from the plurality of the cells and transmitting data to the mobile station through a resource region having a guard time according to the information on the delay times.

Preferably, a guard band exists between the resource region and a resource region allocated by the serving cell to mobile stations communicating with a single cell.

To further achieve these and other advantages and in accordance with the purpose of the present invention, a method of receiving data at a mobile station communicating with a plurality of cells in a wireless communication system, includes the steps of transmitting information on delay times of signals to a serving cell, wherein the signals are received from the plurality of the cells by the mobile station and receiving data from the serving cell through a resource region having a guard time according to the information on the delay times.

Preferably, a guard band exists between the resource region and a resource region allocated by the serving cell to mobile stations communicating with a single cell.

It is to be understood that both the foregoing general description and the following detailed description are exemplary and explanatory and are intended to provide further explanation of the invention as claimed.

Advantageous Effects of Invention

According to embodiments of the present invention, a user equipment transmits data in a manner of inserting a cyclic prefix or guard time according to information on delay time of signals received from a plurality of cells, whereby timing error in a multi-cell environment can be solved.

Effects obtainable from the present invention are non-limited by the above mentioned effects. And, other unmentioned effects can be clearly understood from the following description by a person having an ordinary knowledge in the technical field to which the present invention pertains.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or stationary user stage device as a user equipment (UE), a mobile station (MS) and the like and that a base station is a common name of such a random node of a network stage communicating with a terminal as a node B, eNode B, a base station and the like.

A data transmitting method for supplementing a delay of signal in an environment having uncertainty for the delay of signal according to an embodiment of the present invention is explained with reference to the accompanying drawings as follows. In particular, in order to supplement a delay of signal, a method of changing a structure of OFDM symbol, a method of changing a multiplexing scheme, and a method of changing a configuration of signal according to embodiments of the present invention are explained in the following description.

In a method of supplementing a delay of signal, a guard time for a time delay is inserted in general. In order to maintain subcarrier orthogonality of OFDM, a guard is preferably implemented using a cyclic prefix or a cyclic postfix rather than a simple time guard region. Therefore, an embodiment of the present invention is focused on a method of implementing a cyclic prefix or a cyclic postfix.

A method of transmitting data according to a first embodiment of the present invention is explained with reference to FIG. 1 as follows.

First of all, in a single cell environment, a CP length is set in consideration of a delay spread of signal only. In this case, the delay spread of signal is affected by a geographical environment of a cell. In a single cell environment, a CP is used to supplement a round trip delay and a multipath delay and performs timing advance using a random access channel (RACH), whereby a system can operate without problems. Yet, in a multi-cell environment, it is necessary to supplement a propagation delay of signal, i.e., a delay time taken for a signal containing significant energy therein to come in as well as the multipath delay.

According to a first embodiment of the present invention, a CP length is set longer than that of a single cell environment and is also set to supplement a maximum signal delay time of a system.

A plurality of cells in progress of communication with a user equipment receives information on a delay time of signal from the user equipment. In this case, the user equipment is able to transmit the information on the delay time of the signal to a serving cell or an adjacent cell. If the user equipment transmits the information on the delay time of the signal to the serving cell, the serving cell delivers the information on the delay time of the signal to the adjacent cell. And, the user equipment is able to transmit the information on the delay time of all signals of a plurality of the cells in progress of communication or a maximum delay time of a specific cell only.

The serving cell predetermines a maximum delay time a system can afford and then informs user equipments of the predetermined maximum delay time as broadcast information. The user equipment is then able to transmit information on a delay time of an adjacent cell having a signal delay time set within the maximum delay time only. In doing so, the user equipment is able to transmit delay time information of each adjacent cell or a maximum delay time of a specific cell only.

A base station, which transmits data to the user equipment in progress of communication with a plurality of the cells inserts a CP having a length determined according to the received information on the signal delay time into data and then transmits the corresponding data. The length of the CP can be determined through mutual communication between base stations. Alternatively, a CP length can be directly delivered from the serving cell instead of a delay time.

Figure 1:
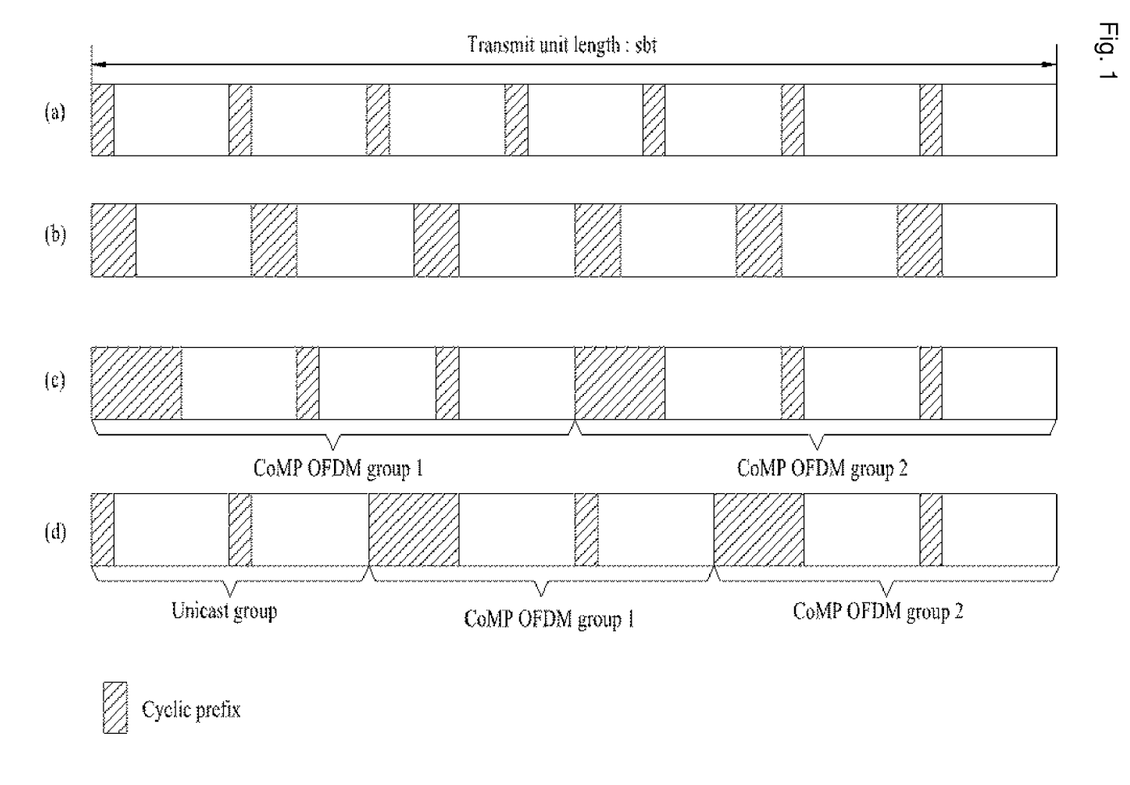
FIG. 1 is a diagram for a structure of a transmit unit in a data transmitting method according to a first embodiment of the present invention.

FIG. 1 is a diagram for a structure of a transmit unit in a data transmitting method according to a first embodiment of the present invention. A transmit unit can include a frame, a subframe or a slot. And, FIG. 1 shows a case that a transmit unit is a slot.

FIG. 1 (a) shows a slot having normal slots inserted therein according to a related art. Referring to FIG. 1 (a), 1 slot includes 7 OFDM symbols, in which normal CPs are inserted, according to a related art.

FIGS. 1 (b) to 1 (d) show that a CP longer than a related art normal CP is inserted according to a first embodiment of the present invention.

According to a first embodiment of the present invention, in case that a resource region supporting a user equipment communicating with a single cell uses a normal CP, a resource region supporting CoMP uses a CP longer than the normal CP. The resource region supporting the CoMP can be defined by a unit of frame, subframe, slot or OFDM symbol.

In this case, the resource region supporting the CoMP can use an extended CP predefined by a system or a CP for MBMS (multimedia broadcast multicast service).

In case that a CP longer than a normal CP predefined by a system does not exist, at least one OFDM symbol is switched and used as a CP in one transmit unit.

FIG. 1 (b) shows a case that CP lengths of OFDM symbols within a transmit unit are equally extended. In this case, a CP length of each of the OFDM symbols is extended by a value resulting from dividing a total length of OFDM symbol switched to a CP by the number of OFDM symbols for carrying the data.

FIG. 1 (c) shows a case that a plurality of CoMP applied OFDM symbol groups. Referring to FIG. 1 (c), if a plurality of OFDM symbol groups having the CoMP scheme applied thereto exist, it is able to extend a CP of an OFDM symbol located at the head of each OFDM symbol group only.

FIG. 1 (d) shows a case that a transmit unit includes an OFDM symbol supporting a user equipment communicating with a single cell and an OFDM symbol having a CoMP scheme applied thereto. Referring to FIG. 1 (d), it is able to extend a CP of an OFDM symbol to which a CoMP scheme is applied only. As OFDM symbols are consecutively provided to for an OFDM symbol group, it is able to extend a CP of an OFDM symbol at the head of the corresponding OFDM symbol group only.

On the basis of unicast transmission, a user equipment arrives at an initial normal state based on information received via a primary synchronization channel (P-SCH) and a secondary synchronization channel (S-SCH) in an initial access state. And, the setting of CoMP transmission is applied to user equipments in normal state. Therefore, a 1st subframe including a synchronization channel and a 6th subframe may not be selected as resources for supporting CoMP.

According to a first embodiment of the present invention, it is able to supplement delays of signals received from a plurality of cells, respectively.

In the following description, a method of transmitting data according to a second embodiment of the present invention is explained with reference to FIG. 2 and FIG. 3.

According to a second embodiment of the present invention, a multiplexing method for bringing an effect of extending a CP length is used. According to a second embodiment of the present invention, a signal is rendered to repeatedly appear in a time domain to use a portion of the repeated signal as a cyclic prefix or a cyclic postfix.

Figure 2:
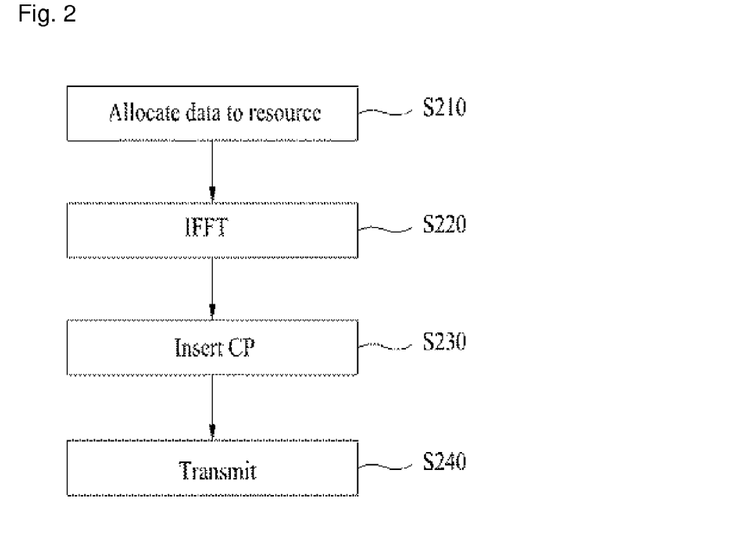
FIG. 2 is a flowchart of a data transmitting method according to a second embodiment of the present invention.

FIG. 2 is a flowchart of a data transmitting method according to a second embodiment of the present invention.

Referring to FIG. 2, a base station allocates data, which will be transmitted, to a resource region [S210]. In doing so, the base station allocated the data to the resource region with an interval of at least two subcarriers. If the data to transmit is allocated on a frequency axis with 2-subcarrier interval, a corresponding OFDM symbol generates a waveform repeated twice on a time axis. If the data to transmit is allocated on a frequency axis with 3-subcarrier interval, a corresponding OFDM symbol generates a waveform repeated three times on a time axis.

The base station performs IFFT (inverse fast Fourier transform) on the data allocated to a frequency domain [S220] and then inserts a CP in the data [S230].

If IFFT (inverse fast Fourier transform) is performed on a signal in a frequency domain, the signal is transformed into a signal in a time domain.

Figure 3:
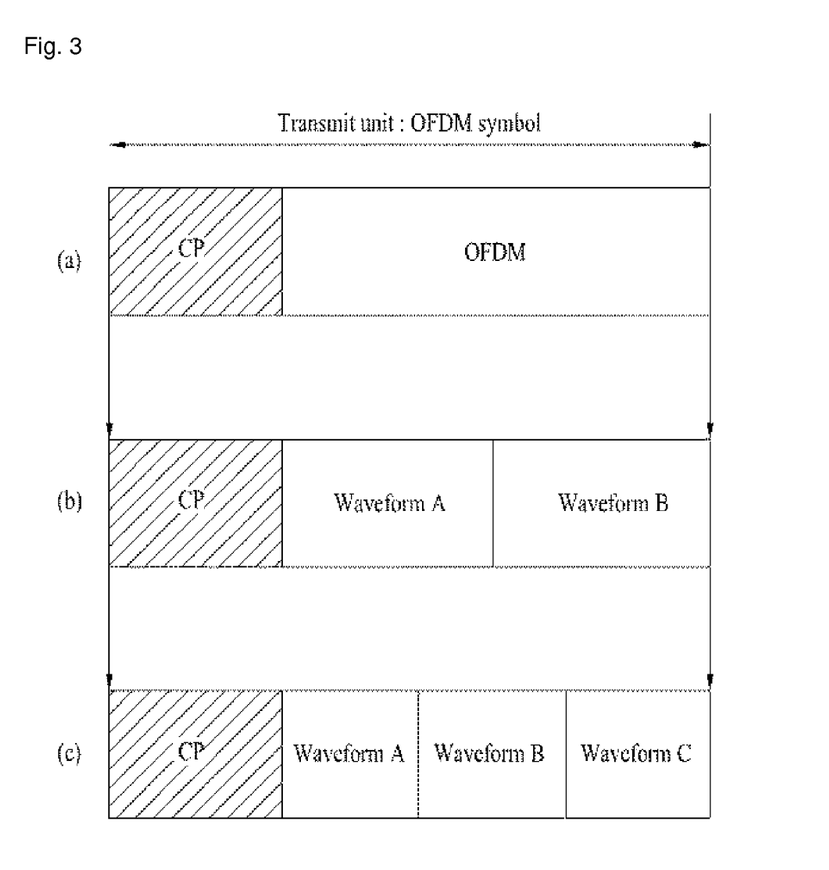
FIG. 3 is a diagram of a signal in a time domain according to a second embodiment of the present invention.

FIG. 3 is a diagram of a signal in a time domain according to a second embodiment of the present invention.

FIG. 3 (b) shows a case that data to transmit is allocated to a frequency domain with 2-subcarrier interval. Referring to FIG. 3 (b), if data to transmit is allocated with 2-subcarrier interval, a waveform repeated twice on a time axis is generated.

FIG. 3 (c) shows a case that data to transmit is allocated to a frequency domain with 3-subcarrier interval. Referring to FIG. 3 (c), if data to transmit is allocated with 3-subcarrier interval, a waveform repeated three times on a time axis is generated.

In FIG. 3, waveforms A, B and C can be equal to or different from each other according to a method of allocating data in a frequency domain.

In this case, if a waveform is repeated twice, one of the repeated waveforms can be utilized as a cyclic prefix or a cyclic postfix. If a waveform is repeated three times, a middle wave form is set as a traffic part, a head waveform is utilized as a cyclic prefix, and a tail waveform can be utilized as a cyclic postfix.

According to a second embodiment of the present invention, a user equipment performing single point transmission/reception is not affected at all. And, it is able to supplement each delay of signals received from a plurality of cells for a user equipment performing CoMP (coordinated multi-point).

In the following description, a method of transmitting data according to a third embodiment of the present invention is explained with reference to FIG. 4 and FIG. 5.

According to a third embodiment of the present invention, while a related art OFDM symbols structure is maintained, a process different from that of a resource for supporting a user equipment communicating with a single cell is applied to a resource for supporting CoMP.

Figure 4:
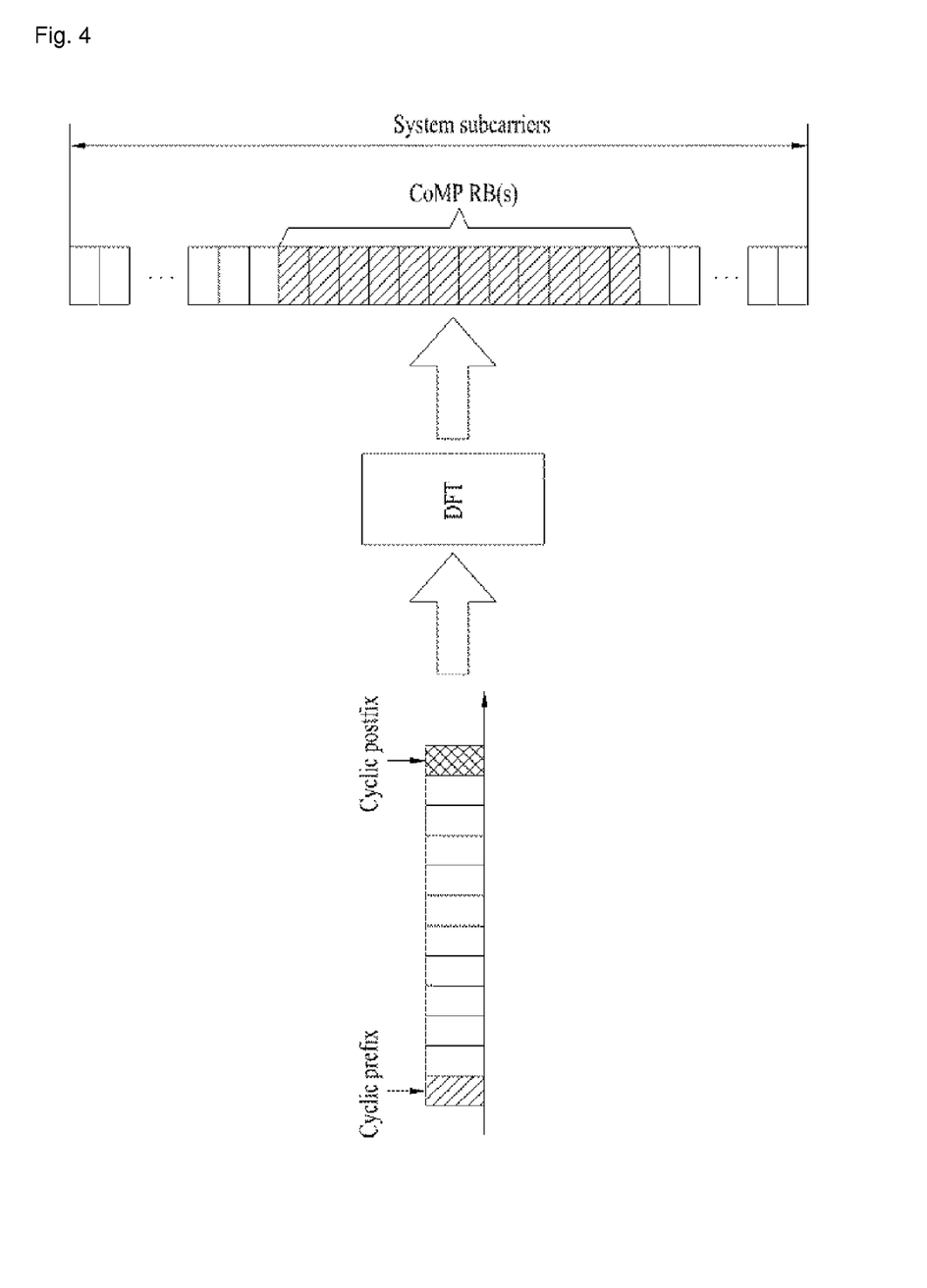
FIG. 4 is a diagram for a data allocating process according to a third embodiment of the present invention.

FIG. 4 is a diagram for a data allocating process according to a third embodiment of the present invention.

Referring to FIG. 4, a base station arranges data in a single carrier transmission format in a time domain and then inserts a cyclic prefix and/or a cyclic postfix in front and/or rear of the data.

In doing so, after the cyclic prefix or the cyclic postfix has been inserted, if signals having different delay times are received, it is able to maintain orthogonality of a corresponding OFDM symbol. If both of the cyclic prefix and the cyclic postfix are inserted, one of them is used to maintain orthogonality of OFDM symbol and the other is used to prevent inter-symbol interference. If both of the cyclic prefix and the cyclic postfix are inserted, it is able to set a cyclic prefix or postfix interval to 'null'.

If the cyclic prefix or postfix is set to 'null', a null part is used to eliminate inter-symbol interference. This brings an effect of eliminating interference from a case that a CoMP signal and a signal for a unicast user equipment are overlapped with each other. Namely, interference can be eliminated from such a portion as a subframe boundary and the like. There is another advantage as follows. First of all, if a cyclic prefix and/or a cyclic postfix set to 'null' for each OFDM symbol is set, a corresponding part is helpful to maintain signal orthogonality between different user equipments in an interval for transmitting a CoMP signal as well. In this case, a size of the cyclic prefix and/or the cyclic postfix is determined through information on a delay time exchanged between base stations or can be determined based on information on a size of a cyclic prefix and/or a cyclic postfix instructed by a serving cell. If necessary, it is able to add a reference symbol dedicated to a user equipment to this time domain signal part. In doing so, the reference symbol exists behind a null cyclic postfix or null information can be transmitted ahead of or behind the reference symbol.

Subsequently, the base station performs DFT (discrete Fourier transform) on a signal in a time domain and then maps the transformed signal by a subcarrier on a frequency axis.

The base station transforms the signal in the frequency domain into a signal in a time domain by performing inverse fast Fourier transform. FIG. 5 is a diagram of a signal in a time domain according to a third embodiment of the present invention.

Figure 5:
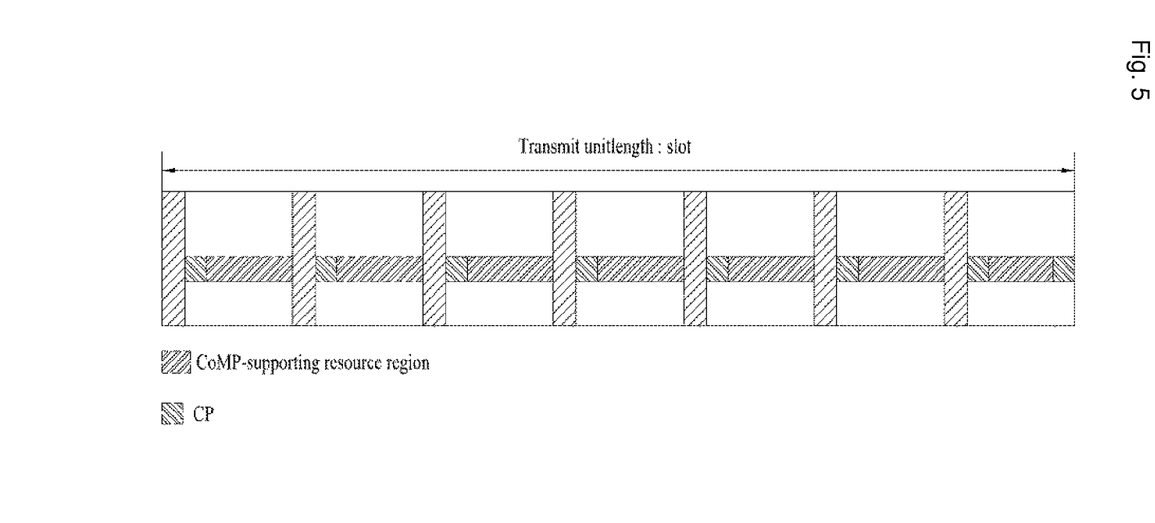
FIG. 5 is a diagram of a signal in a time domain according to a third embodiment of the present invention.

Referring to FIG. 5, if a symbols is generated using DFT, a resource region for supporting CoMP includes an additional CP. If a cyclic prefix and a cyclic postfix are inserted prior to DFT, an additional cyclic prefix and an additional cyclic postfix are included like a last symbol shown in FIG. 5. In this case, the cyclic postfix can be a null interval (guard time). The null interval of the last symbol is provided not to interfere with a next slot or a next subframe. Yet, a structure of a cyclic prefix and/or postfix in the last symbol is identically applicable to a random OFDM symbol.

In case that a length of a transmit unit is a subframe or a resource block at the same position in each slot is used, a null interval is just included in a last OFDM symbol.

Meanwhile, a common reference signal (common RS) or a dedicated reference signal (dedicated RS) occasionally needs to be inserted in a CoMP supporting resource. In order to insert a common reference signal, data should not be allocated to a subcarrier in which the common reference signal will be inserted. According to the third embodiment of the present invention, three kinds of methods for inserting a common reference signal are proposed.

According to a first method, a base station arranges information symbol subcarriers, which amount to a length resulting from subtracting the number of reference signals from the number of subcarriers of a CoMP supporting resource, in a signal carrier in a time domain and then performs DFT thereon. Subsequently, mapping is performed on the DFT data except a part, to which a reference signal will be allocated, of subcarriers in a frequency domain.

According to a second method, a base station sets a DFT size equal to the number of subcarriers of a CoMP supporting resource and inserts a control symbol in a position determined in a time domain, whereby a value allocated to a specific subcarrier after DFT can be set to 0 or an arbitrary value. A common reference signal is then allocated to the subcarrier set to 0 or an arbitrary value.

According to a third embodiment, after a DFT size has been set equal to the number of subcarriers of a CoMP supporting resource, when resource mapping is performed in a frequency domain, a site for inserting a common reference signal therein is punctured.

A dedicated reference signal can be inserted in a frequency or time domain by inserting a pilot. In case of inserting a dedicated reference signal in a frequency domain, the dedicated reference signal can be inserted by the same method of inserting a common reference signal. In case of inserting a dedicated reference signal in a time domain, a pilot is inserted on a time axis prior to performing DFT and the DFT is then performed on a whole part.

A pilot can be inserted locally or with a uniform interval. If time-variation of channel is severe, an equal interval arrangement is important. Yet, if a delay-spread of channel is dominant, it is more effective to insert a reference symbol in a predetermined zone by localization. If the delay-spread has considerable influence, a guard interval of a cyclic prefix or postfix type can be inserted in the vicinity of a reference symbol to facilitate a user equipment to perform channel estimation. In this case, the guard interval may be set to 'null'.

In the following description, a method of transmitting data according to a fourth embodiment of the present invention is explained with reference to FIG. 6.

According to a fourth embodiment of the present invention, a base station generates a signal for a resource, which supports a user equipment communicating with a single cell, based on a basic OFDM symbol structure. And, a base station generates a signal for a resource, which supports CoMP, based on a different OFDM symbol structure.

Figure 6:
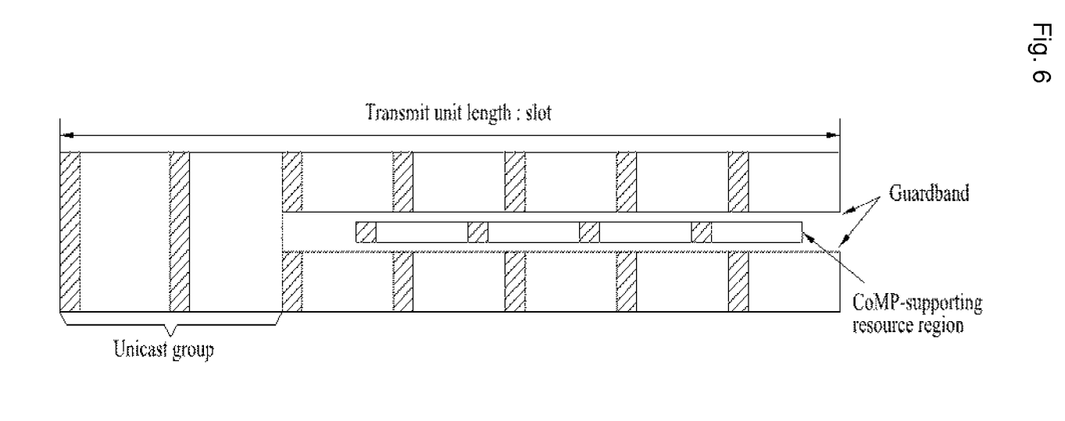
FIG. 6 is a diagram for a transmit unit according to a fourth embodiment of the present invention.

FIG. 6 is a diagram for a transmit unit according to a fourth embodiment of the present invention.

Referring to FIG. 6, guard bands are provided next to both sides of a CoMP supporting resource on a frequency axis. Each of the guard bands reduces inter-subcarrier interference within an OFDM symbol.

Guard times can exist at a start and end of the CoMP supporting resource region on a time axis. In particular, a base station transmits a signal with a relative offset in consideration of a delay time received from a user equipment. If so, signals received by the user equipment from a plurality of cells are synchronized with each other. Hence, it is able to transmit data without extending a CP length.

Alternatively, the CoMP supporting resource region can have one of various CP structures according to the first embodiment. In this case, guard times can exist at a start and end of the CoMP supporting resource region.

In case that a CoMP supporting subframe is set by TDM, a base station determines the above described transmitting method or one of CoMP methods extended from the former transmitting method, defines a control information field in PDCCH DCI format, and is then able to inform each user equipment of it by L1/L2 control signaling on PDCCH. Moreover, in case that CoMP transmission and reception are semi-statically applied, the base station is able to inform a user equipment of the determined CoMP transmitting method by UE-specific RRC.

If there are N (N>2) kinds of methods applicable to the CoMP transmission and reception, a control information field is set to N bits in a bitmap format or can be set to bits in state.

Alternatively, if a limited type is supported for a CoMP transmitting method that will be used by a user equipment, a partial subset in whole CoMP transmission schemes is defined, a corresponding subset is indicated by UE-specific RRC signaling, it is then able to indicate one applicable scheme among schemes of the subset via PDCCH.

Alternatively, a base station sets subframe configuration information of 40 ms interval or arbitrary interval within 10 ms radio frame for cell common use and then represents the subframe configuration information indicating a CoMP transmission scheme in the set interval as system information using a bitmap or another compression scheme. The CoMP relevant subframe configuration information is signaled to an upper layer or can be indicated to all user equipments within a cell or a designated user equipment group on a series of dedicated control channels or a cell common PDCCH. In representing the subframe configuration information as a bitmap, a bitmap size can be basically defined as P*10 if a period is represented as 'P'. If 1st and 6th subframes are excluded, the bitmap size can be defined as P*8. If the number of subframes excluded on the ms radio frame is set to Q, the bitmap size can be defined as P*(10−Q).

In case that a CoMP supporting subframe is set by FDM, a base station determines the above described transmitting method or one of CoMP methods extended from the former transmitting method, defines a control information field in PDCCH DCI format, and is then able to inform each user equipment of it by L1/L2 control signaling on PDCCH. Moreover, in case that CoMP transmission and reception are semi-statically applied, the base station is able to inform a user equipment of the determined CoMP transmitting method by UE-specific RRC.

If there are N (N>2) kinds of methods applicable to the CoMP transmission and reception, a control information field is set to N bits in a bitmap format or can be set to bits in state.

Alternatively, if one of the N kinds of methods is applied to CoMP transmission of a user equipment, a subset is indicated by UE-specific RRC signaling and one applicable scheme among schemes of the subset can be indicated via PDCCH.

Alternatively, a base station sets subframe configuration information of 40 ms interval or arbitrary interval within 10 ms radio frame for cell common use and then represents the subframe configuration information in the set interval as system information using a bitmap or another compression scheme. The subframe configuration information is signaled to an upper layer or can be indicated to all user equipments within a cell or a designated user equipment group on a series of dedicated control channels or a cell common PDCCH. In representing the subframe configuration information as a bitmap, a bitmap size can be defined as R if the number of resource blocks or subbands of a considered system bandwidth is R. If the number of excluded resource blocks or subbands is S, the bitmap size can be defined as R-S.

In case that a series of subband regions within a whole system bandwidth is set as a CoMP supporting resource in common to cell, this configuration information is represented as system information using a bitmap or another compression scheme. This is then signaled to an upper layer or can be indicated to all user equipments within a cell or a designated user equipment group on a series of dedicated control channels or a cell common PDCCH.

Figure 7:
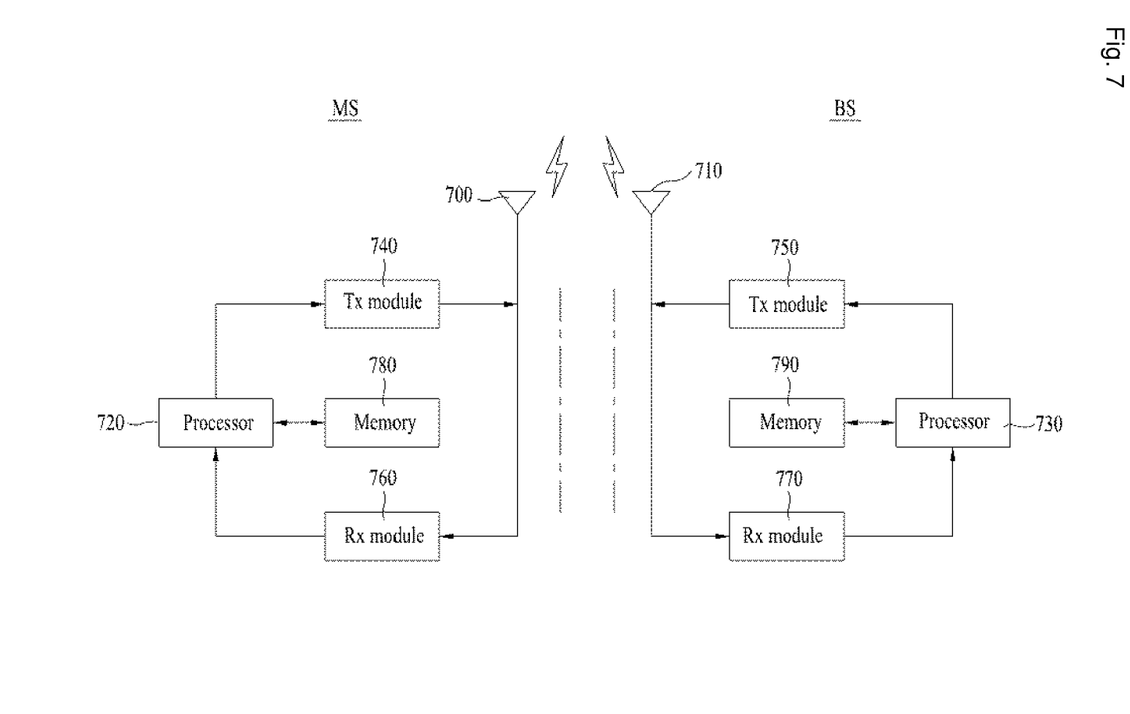
FIG. 7 is a block diagram for configurations of mobile and base stations for implementing embodiments of the present invention.

FIG. 7 is a block diagram for configurations of mobile and base stations for implementing embodiments of the present invention.

Referring to FIG. 7, a mobile station/base station (AMS/ABS) includes an antenna 700/710 configured to transmit and receive information, data, signals, messages and/or the like, a transmitting (Tx) module 740/750 transmitting a message by controlling the antenna, a receiving (Rx) module 760/770 receiving a message by controlling the antenna, a memory 780/790 configured to store informations related to communication with the base station, and a processor 720/730 configured to control the receiving module and the memory. In this case, the base station can include a femto base station or a macro base station.

The antenna 700/710 plays a role in transmitting a signal generated by the transmitting module 740/750 externally and also plays a role in receiving an external radio signal and then forwarding the received radio signal to the receiving module 760/770.

The processor 720/730 normally controls overall operations of the mobile station or the base station. In particular, the processor 720/730 is able to perform a control function, a MAC (medium access control) frame variable control function according to service characteristics and radio wave environment, a handover function, an authentication function, an encryption function and the like to implement the above mentioned embodiments of the present invention. The processor 720/730 is able to further include an encryption module configured to control encryption of various messages and a timer module configured to control transmission and reception of various messages.

The transmitting module 740/750 performs prescribed coding and modulation on a signal and/or data, which is scheduled by the processor and will be externally transmitted, and then delivers the coded and modulated signal and/or data to the antenna 700/710.

The receiving module 760/770 reconstructs a radio signal externally received via the antenna 700/710 into original data by performing decoding and demodulation on the received radio signal and then delivers the reconstructed data to the processor 720/730.

Programs for processing and control of the processor can be stored in the memory 780/790. And, the memory 780/790 can perform a function of temporary storage of inputted/outputted data (in case of a mobile station, an uplink (UL) grant allocated by a base station, system information, a station identifier (STID), a flow identifier (FID), an action time, region allocation information, frame offset information, etc.).

Moreover, the memory 780/790 can include at least one of storage medium selected from flash memory type memory, hard disk type memory, multimedia card micro type memory), card type memory (e.g., SD memory, XD memory, etc.), Random Access Memory (RAM), SRAM (Static Random Access Memory), Read-Only Memory (ROM), EEPROM (Electrically Erasable Programmable Read-Only Memory, PROM (Programmable Read-Only Memory), magnetic memory, magnetic disk, optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

The invention claimed is:

1. A method of transmitting data to a mobile station communicating with a plurality of cells at a serving cell in a wireless communication system, comprising:
   generating a time domain signal by arranging data on a single carrier in the time domain and inserting a cyclic prefix and/or a cyclic postfix and inserting a control symbol; and
   generating a frequency domain signal by performing discrete Fourier transform (DFT) on the time domain signal and then mapping the DFT performed signal to a first subcarrier on a frequency axis and mapping a common reference signal (CRS) to a second subcarrier,
   wherein the first subcarrier is a subcarrier of a Coordinated Multi Point (CoMP) supporting resource, and the second subcarrier is a subcarrier having value 0 as a result of the inserting the control symbol, and
   wherein a size of the DFT corresponds to the number of subcarrier of a Coordinated Multi Point (CoMP) supporting resource.

2. The method of claim 1, further comprising:
   performing inverse fast Fourier transform (IFFT) on the frequency domain signal; and
   transmitting the IFFT performed signal.

3. A method of transmitting data to a mobile station communicating with a plurality of cells at a serving cell in a wireless communication system, comprising:
   receiving information on delay times of signals from the mobile station, wherein the signals are received by the mobile station from the plurality of the cells;
   transmitting data to the mobile station through a first resource region having a guard time on a time axis according to the information on the delay times,
   wherein a guard band on a frequency axis exists between the first resource region and a second resource region allocated by the serving cell to mobile stations communicating with a single cell, and
   wherein the guard time and the guard band are set according to a specific applicable transmission scheme among the plurality of CoMP (Coordinated multi-point) transmission schemes included in a subset, and
   wherein the specific applicable transmission scheme is indicated by PDCCH (Physical Downlink Control CHannel), and
   wherein the subset is indicated by RRC (Radio Resource Control) signaling.

4. A method of receiving data at a mobile station communicating with a plurality of cells in a wireless communication system, comprising:
   transmitting information on delay times of signals to a serving cell, wherein the signals are received from the plurality of the cells by the mobile station; and
   receiving data from the serving cell through a first resource region having a guard time on a time axis according to the information on the delay times,
   wherein a guard band on a frequency exists between the first resource region and a second resource region allocated by the serving cell to mobile stations communicating with a single cell, and
   wherein the guard time and the guard band are set according to a specific applicable transmission scheme among the plurality of CoMP (Coordinated multi-point) transmission schemes included in a subset, and
   wherein the specific applicable transmission scheme is indicated by PDCCH (Physical Downlink Control CHannel), and
   wherein the subset is indicated by RRC (Radio Resource Control) signaling.

* * * * *